(12) United States Patent
Kodaypak et al.

(10) Patent No.: US 11,146,645 B2
(45) Date of Patent: *Oct. 12, 2021

(54) NEXT GENERATION MOBILITY CORE NETWORK CONTROLLER FOR SERVICE DELIVERY

(71) Applicant: AT&T INTELLECTUAL PROPERTY I, L.P., Atlanta, GA (US)

(72) Inventors: Rajendra Prasad Kodaypak, Sammamish, WA (US); Jianrong Wang, Issaquah, WA (US); Jiansong Wang, Parlin, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,314

(22) Filed: Feb. 7, 2020

(65) Prior Publication Data
US 2020/0177687 A1    Jun. 4, 2020

Related U.S. Application Data

(63) Continuation of application No. 15/619,337, filed on Jun. 9, 2017, now Pat. No. 10,601,932.

(51) Int. Cl.
*H04L 29/08* (2006.01)
*H04L 12/26* (2006.01)
(Continued)

(52) U.S. Cl.
CPC .......... *H04L 67/18* (2013.01); *H04L 41/0803* (2013.01); *H04L 41/0806* (2013.01);
(Continued)

(58) Field of Classification Search
CPC .......... H04L 41/0803; H04L 41/0896; H04W 72/00; H04W 72/048
See application file for complete search history.

(56) References Cited

U.S. PATENT DOCUMENTS 9,066,260 B2   6/2015 Hsu
10,219,193 B2 *  2/2019 Kim ..................... H04W 4/02
(Continued)

FOREIGN PATENT DOCUMENTS

CN    104243301 A    12/2014
EP    1187353 A2     3/2002
(Continued)

OTHER PUBLICATIONS

Li, et al. "An end-to-end network slicing framework for 5G wireless communication systems" arXiv preprint arXiv:1608.00572 (2016). 13 pages.
(Continued)

*Primary Examiner* — Lashonda T Jacobs
(74) *Attorney, Agent, or Firm* — Amin, Turocy & Watson, LLP

(57) ABSTRACT

Network and/or application resources can be dynamically instantiated based on service attributes and/or network capabilities. In one aspect, a customized and/or localized core slice can be selected that can deliver the requested service with target performance parameters. According to an aspect, dynamic selection, control, and/or management reporting can be provided for core network slices. Moreover, optimal core network slice selection can be performed to reduce network transport costs and efficiently deliver various services using an optimal core slice that matches a service profile being requested by an end user and/or device.

20 Claims, 11 Drawing Sheets

(51) Int. Cl.
*H04L 12/24* (2006.01)
*H04W 72/00* (2009.01)
*H04W 72/04* (2009.01)

(52) U.S. Cl.
CPC .......... *H04L 41/0896* (2013.01); *H04L 43/08* (2013.01); *H04W 72/00* (2013.01); *H04W 72/048* (2013.01); *H04L 67/10* (2013.01)

(56) References Cited

U.S. PATENT DOCUMENTS

| | | | |
|---|---|---|---|
| 2006/0212700 A1* | 9/2006 | Zhang | H04L 63/08 713/167 |
| 2012/0158813 A1* | 6/2012 | Kumar | G06F 9/5055 709/201 |
| 2016/0212017 A1 | 7/2016 | Li et al. | |
| 2016/0352645 A1 | 12/2016 | Senarath et al. | |
| 2016/0352734 A1 | 12/2016 | Senarath et al. | |
| 2016/0352924 A1 | 12/2016 | Senarath et al. | |
| 2016/0353268 A1 | 12/2016 | Senarath et al. | |
| 2016/0353281 A1 | 12/2016 | Senarath et al. | |
| 2016/0353422 A1 | 12/2016 | Vrzic et al. | |
| 2016/0353465 A1* | 12/2016 | Vrzic | H04W 28/0247 |
| 2016/0359682 A1 | 12/2016 | Senarath et al. | |
| 2017/0054595 A1* | 2/2017 | Zhang | H04L 41/12 |
| 2017/0070892 A1 | 3/2017 | Song et al. | |
| 2017/0078157 A1 | 3/2017 | Zhang | |
| 2017/0079059 A1 | 3/2017 | Li et al. | |
| 2017/0331670 A1* | 11/2017 | Parkvall | H04W 52/0245 |
| 2018/0124660 A1* | 5/2018 | Zhang | H04W 36/0055 |
| 2018/0176858 A1* | 6/2018 | Wang | H04W 76/12 |
| 2018/0192445 A1* | 7/2018 | Jiang | H04W 72/0466 |
| 2018/0270712 A1* | 9/2018 | Faccin | H04W 72/10 |
| 2018/0316627 A1* | 11/2018 | Cui | H04L 47/805 |
| 2018/0317133 A1* | 11/2018 | Sciancalepore | H04W 28/26 |
| 2019/0007899 A1* | 1/2019 | Vrzic | H04W 72/12 |
| 2019/0021010 A1* | 1/2019 | Senarath | H04L 41/5006 |

FOREIGN PATENT DOCUMENTS

| | | |
|---|---|---|
| WO | 2016192639 A1 | 12/2016 |
| WO | 2017011827 A1 | 1/2017 |
| WO | 2017023196 A1 | 2/2017 |
| WO | 2017023748 A1 | 2/2017 |
| WO | 2017024005 A1 | 2/2017 |
| WO | 2017044151 A1 | 3/2017 |
| WO | 2017044153 A1 | 3/2017 |

OTHER PUBLICATIONS

Basilier, et al. "A Vision of the 5G Core: Flexibility for New Business Opportunities" Ericsson Technology Review, ericsson.com, Charting the Future of Innovation, vol. 93|#2, 2016. 16 pages.

Nakao, Aki. "Network Softwarization and Slicing: Ongoing Developments in Standard Developing Organizations" The Fifth Generation Mobile Communications Promotion Forum, cscn2016.ieee-cscn.org, The University of Tokyo, 2016. 51 pages.

El Hattachi, et al. "NGMN 5G white paper" NGMN Alliance. Next generation mobile networks, white paper (2015). 125 pages.

Ahmadi. "Toward 5G Xilinx Solutions and Enablers for Next-Generation Wireless Systems" XILINX All Programmable, xilinx.com, WP476 (v1.0) Jun. 13, 2016. 32 pages.

Richart, et al. "Resource slicing in virtual wireless networks: A survey" IEEE Transactions on Network and Service Management 13.3 (2016): 14 pages.

Office Action for U.S. Appl. No. 15/619,337 dated Mar. 8, 2013, 21 pages.

Office Action for U.S. Appl. No. 15/619,337 dated Aug. 19, 2019, 18 pages.

Notice of Allowance for U.S. Appl. No. 15/619,337 dated Nov. 8, 2019, 22 pages.

\* cited by examiner

NEXT GENERATION MOBILITY CORE NETWORK CONTROLLER FOR SERVICE DELIVERY

RELATED APPLICATION

The subject patent application is a continuation of, and claims priority to, U.S. patent application Ser. No. 15/619,337 (now U.S. Pat. No. 10,601,932), filed Jun. 9, 2017, and entitled "NEXT GENERATION MOBILITY CORE NETWORK CONTROLLER FOR SERVICE DELIVERY," the entirety of which application is hereby incorporated by reference herein.

TECHNICAL FIELD

The subject disclosure relates to wireless communications, e.g., next generation mobility core network controller for service delivery.

BACKGROUND

Communication networks are built with access network and core network control functions. The access network control function provides edge computing control for a multitude of devices, that have been granted access to the core network, to perform a target service. Further, the core network control function performs control functions associated with appropriate destinations according to defined criteria to deliver the requested services. A mobility access network function comprises edge control functions and radio/access components that can support different access technologies, for example, cellular, WiFi, Bluetooth™, and/or other low power radio networking technologies, etc. A mobility core network function comprises control plane (CP) and user plane (UP) data handling mechanisms. Typically, the control functions utilize information from network databases (e.g., home subscriber database (HSS)) to determine a policy(ies) for each service request associated with the devices. The UP anchors and executes the commands from the CP and routes the user data traffic pertaining to a given end user requested service. In order to improve efficiency for service delivery, multiple slices of the core network are built for different services, wherein each core network slice can be equipped with different CP and UP data transfer functions and/or policies. Conventional networks utilize network selection mechanisms that are radio access network (RAN) directed, with limited information, and wherein cross-nodal redirections are often performed. This significantly increases network signaling and/or processing times and reduces overall network efficiency, resulting in higher capital and operating costs. Typically, the RAN is pre-configured to direct a service request to a specific core network node to complete a connection/session setup prior to receiving its services. In particular, conventional networking design is static with pre-configured mappings defined per given RAN. This results in an inefficient allocation and utilization of several core network functions and their associated resources serving the RAN technology deployed for service delivery.

DETAILED DESCRIPTION

Figure 1:
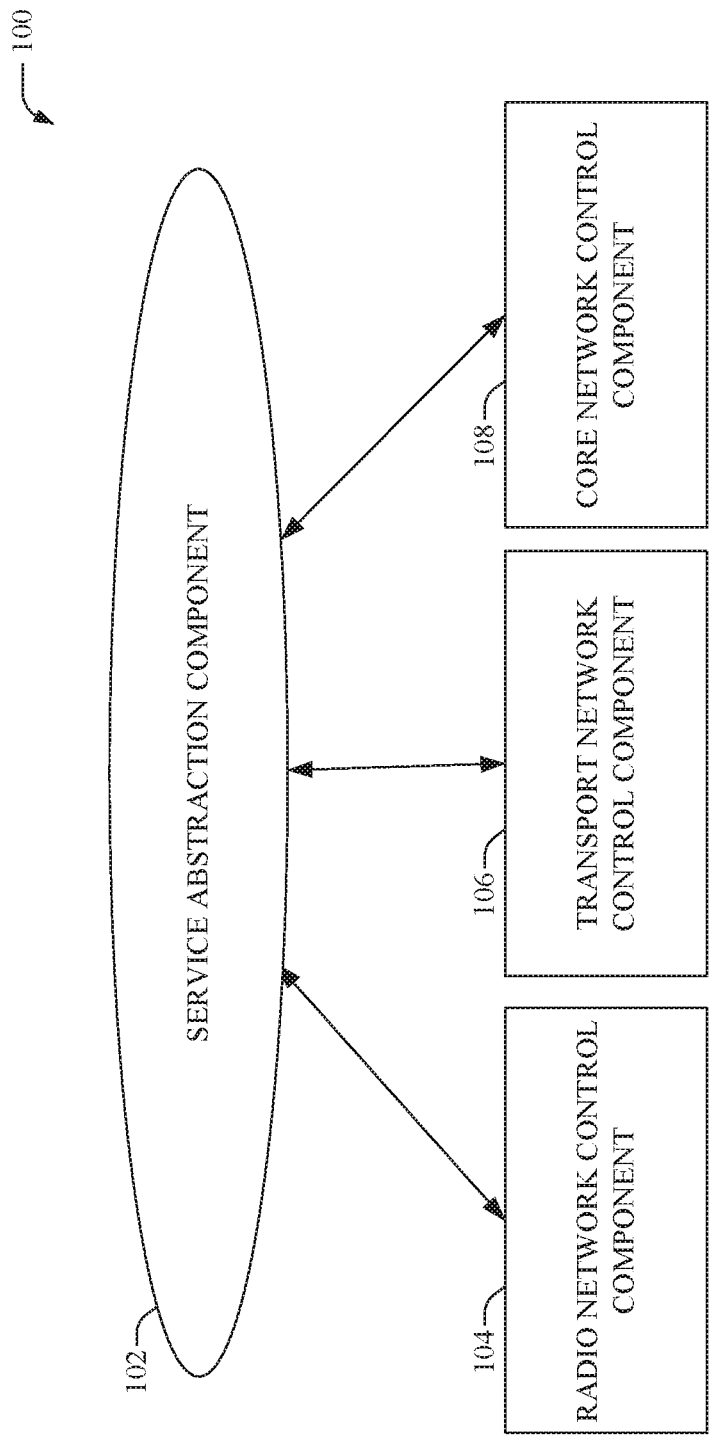
FIG. 1 illustrates an example system that facilitates dynamic allocation of core network slices of a communication network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology, Fifth generation (5G), etc. Additionally, substantially all aspects of the disclosed subject matter can be exploited in legacy (e.g., wireline) telecommunication technologies.

Dedicated core networks (DCN) is an optional 3GPP standards-defined network feature capability that enables an operator to deploy multiple instances of core networks (e.g., core network slices) within a serving home public land mobile network (HPLMN). A dedicated core network slice can comprise selected control and/or traffic forwarding functions, which determine a subscriber's eligibility for the network service, the services the subscriber has requested, and/or a path to route the traffic associated with the service to appropriate destinations. In one or more traditional core network deployments, a radio access network (RAN) is pre-configured to direct traffic, from a user equipment to a given core network node, to complete a connection/session setup prior to receiving its services. The traditional mechanisms of mobility core networking design are static with pre-configured mappings defined per given RAN. This results in an inefficient allocation and utilization of core network functions and their associated resources serving the RAN technology deployed for services delivery.

One or more embodiments of the subject disclosure provide a core network control selection mechanism that allocates an end user/machine device based on its service requests and radio capabilities to a suitable (e.g., customized and/or localized) core network slice that can deliver the requested service with target performance attributes. Typically, next generation global communication and connectivity networks (e.g., fifth generation (5G) networks) are characterized by software defined networking (SDN) principles, heavy cloud computing, control plane (CP) and user plane (UP) data separation, radio access agnostic core network control, etc. The systems and methods disclosed herein, in one or more non-limiting embodiments, provide dynamic and intelligent selection, flexible reconfiguration, control, reconfigurations, and/or management reporting for core network slices of the core communication network. According to an aspect, the systems and/or methods enable optimal network selection and/or reconfiguration in order to reduce the network transport cost and efficiently deliver various services using an optimal core network slice that best fits the service profile (and/or multiple similar service profiles) being requested by the end user and/or device.

Referring initially to FIG. 1, there illustrated is an example system 100 that facilitates dynamic allocation of core network slices of a communication network, according to one or more aspects of the disclosed subject matter. As an example, a core network of a communication network can comprise devices (e.g., gateways, servers, data stores, etc.) that provide communication services to user equipment (UE), which are connected to the communication network via a wired and/or wireless access network (e.g., radio access network (RAN)). Future communication services demand a flexible and software programmable network that can support a broad range of applications that have different service requirements/attributes. System 100 provides an efficient core network control selection mechanism that allocates the UE based on its service requests and radio capabilities to a suitable core slice that can deliver the requested service with target performance requirements/attributes.

The DCN feature capability utilized in conventional systems has several limitations in the way redirections are performed between the access and core network elements and lacks dynamic function reconfiguration and insertion within a service chain. Further, the principles employed by the conventional systems cannot be generically applied between multiple radio access technologies and core networks. At a high level, DCN is network based solution, wherein depending on subscriber profile stored in a network database (e.g., HSS), LTE evolved packet core (EPC) core network control nodes, like mobility management entity (MME), indicate to the RAN control node, when a UE attaches to the network, a specific DCN control node to which traffic is to be steered. Moreover, during a UE's initial network attach/tracking area update procedure, a conventional radio network control node does not have detailed information about the device type and/or its supported services, and merely selects a control node (e.g., MME) in a DCN via pre-configured and/or static logic in the access and core network. When the UE is connected to the MME (e.g., via a non-access stratum (NAS) layer), the MME can retrieve a subscriber profile associated with the UE from the HSS, and send, to the RAN control node, correct DCN information, in case the UE is not connected to the correct MME. This results in a redirection, wherein the radio network control node will reconnect the UE to the correct DCN per first control node's direction. Further, since there is limited information provided by the UE during initial correspondence with the eNodeB (eNB) and lack of device specific intelligence extracted in the eNB, oftentimes the eNB does not send the UE attach request to the correct control node (MME) for the first time, and thus the number of DCN redirections performed is significant. Furthermore, the DCN redirections can be performed during a UE handover and/or when a subscriber profile (associated with the UE) is updated. These conventional redirection procedures during device initial network attach and/or hand-over result in unnecessary CP signaling between the access and core network functions and increased message processing times, eventually causing incremental and/or unwanted network costs. This can negatively affect network performance and services delivery. Some conventional systems provide enhancements to improve the user network selection logic, wherein current subscriber profile parameters are retrieved from HSS by an MME and utilized to facilitate network selection. However, these systems have limited efficiency in coordinating the core network selection since device services and/or network performance optimization is not considered.

Steering a UE to the correct control node during an initial signaling phase is critical to speed up the connection establishment process en-route to rapid service instantiation. Independent of the nature of the network function evolution coupled with their operations support systems (OSS) design (e.g., physical and/or virtualized platforms), efficient utilization of overall network resources is key to maintaining low capital and/or operating costs while delivering enhanced value and/or effortless service experience to end users/machines. According to an aspect, system 100 provides a service abstraction component 102 that has a full insight into all the network layers (e.g., RAN, core network, and/or transport network layers). In one example, the service abstraction component 102 facilitates directing a UE to a correct control node (of a selected and/or a reconfigured network slice which is optimal for one more services) during the initial signaling phase based on facilitating interoperability between a radio network control component 104, a transport network control component 106, and a core network control component 108. As the technology evolves to aggregate multiple radio access edge networks with an open standards based interface to a common core transport, the service abstraction component 102 can provide a dynamic, intelligent, and/or controlled means of directing the UE to a targeted core network slice that can deliver end-to-end service values by respecting network design and deployment principles.

In one aspect, the service abstraction component 102 can reduce the network capital costs in design and/or building of the core network and can improve the overall efficiency in operating and/or monitoring of various network functions involved in a delivery of mobility services for consumers, enterprises, and/or government solutions etc. Further, the service abstraction component 102 can provide efficient connectivity of UEs in the network across several industry verticals leading to new business models, which can result in driving high-speed mobile social networking changes that were not possible with conventional systems.

According to an embodiment, the radio network control component 104 can aggregate information associated with different access points deployed within a region and provide the information to the service abstraction component 102. In one example, the access points can operate using different radio access technologies, such as, but not limited to, 4G, 5G, 3G, WiFi, low power wide area networks, and/or other non 3GPP technologies. Similarly, the transport network control component 106 can aggregate information associated with different devices (e.g., routers and/or switches hosted on central office and/or switching office environments) of backhaul networks that are on the egress and/or ingress of the infrastructure between the RAN and core network, and provide the information to the service abstraction component 102. For example, the backhaul networks can comprise, but are not limited to, wired networks, wireless networks, satellite networks, microwave networks, mesh networks, optical infrastructure, etc. In one aspect, the service abstraction component 102 can analyze the information to provide appropriate triggers to the core network control component 108 that can be utilized to manage existing and/or create new core network slices for serving UEs or a specific class, requesting a specific service, and/or are located within a specific area.

The core network control component 108 can be utilized to manage (e.g., instantiate, update, delete, etc.) one or more network slices of core network. In one example, a network slice can comprise a logical/virtual replication of core network elements employed to enable a specified service. Moreover, the network slices can comprise virtual networks built on top of a common/shared physical infrastructure. As an example, the virtual networks refer to implementing the functions of infrastructure nodes in software on commercial "off-the-shelf" computing equipment. Virtualization can decrease capital and/or operating costs, reduce time for deployment of new services, improve energy savings, and/or enhance network efficiency. In one aspect, the network slices can be customized (e.g., in terms of resources allocated, latency, bandwidth, etc.) for respective services handled by the network slices. This enables operators to provide software programmable networks and functions on an as-a-service basis and/or functions/components on an as-a-service basis, which can significantly improve operational efficiency and/or reduce time-to-market for new services. In one example, the network slices can be implemented via one or more gateway devices (e.g., legacy gateways, control plane gateways and/or user plane gateways) that perform functions of, but not limited to, switches, routers, repositories, policies, home location register (HLR), serving GPRS support node (SGSN), gateway GPRS support node (GGSN), combined GPRS support node (CGSN), radio network controller (RNC), serving gateway (SGW), packet data network gateway (PGW), residential gateway (RGW), broadband remote access server (BRAS), carrier grade network address translator (CGNAT), deep packet inspection (DPI), provider edge (PE) router, mobility management entity (MME), element management system (EMS), etc.

The architecture disclosed in system 100 facilitates application of network functions virtualization (NFV) and/or software-defined networking (SDN) technologies. NFV can virtualize network services that have been conventionally carried out by proprietary, dedicated hardware/software and instead host the network services on one or more virtual machines (VMs). Using NFV, network service providers do not need to purchase proprietary/dedicated hardware devices to enable a service. NFV can improve scalability and flexibility and network capacity can easily be adjusted through software, resulting in reduced capital expenses and/or operating expenses. NFV and SDN are different technologies but complementary. SDN architectures decouple or disassociate network control (e.g., control plane) and forwarding (e.g., data plane) functions. This allows for dynamic, programmable, and/or scalable computing and storage. The SDN architecture can be at least (i) directly programmable; (ii) agile; (iii) centrally managed; (iv) programmatically configured; and/or (v) open standards-based and vendor-neutral.

In one example, system 100 can be deployed in 5G networks that provide enhanced mobile broadband, for example, ultra high bandwidth (e.g., 20 Gbps), high spectral efficiency (e.g., 3.5x of LTE), ultra dense networks, and/or energy efficiency. Further, the 5G networks can provide ultra-reliable (e.g., high reliability greater than 99.999%) and low latency communications (e.g., ultra low latency of ~1 msec and/or low network access and synchronization time). Furthermore, the 5G networks can facilitate massive machine type communication (e.g., ultra high density ($10^6$/sq km), long battery life (10 years+), high system gain (better than narrow band-IoT and/or more efficient than narrow band-IoT).

Figure 2:
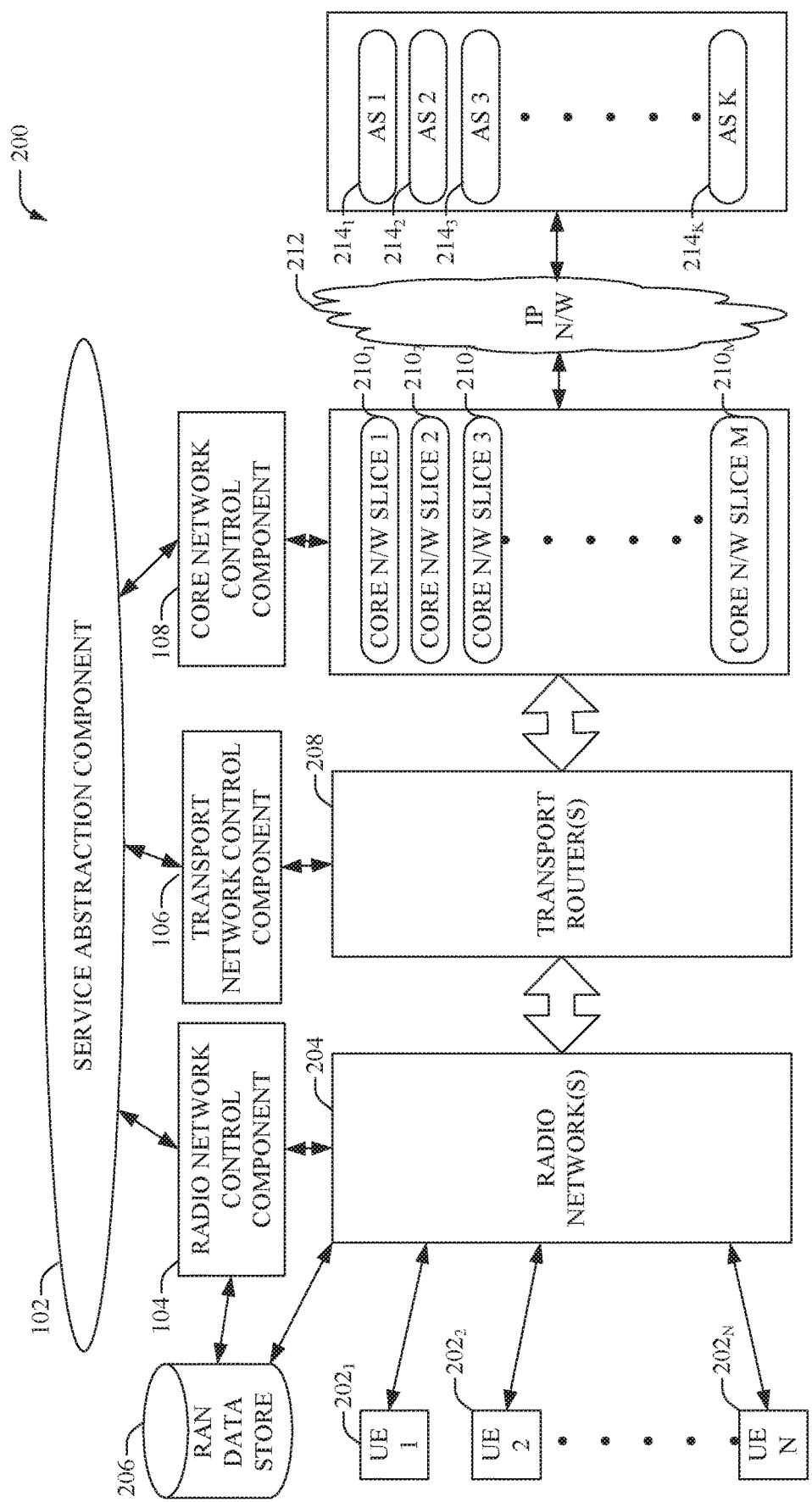
FIG. 2 illustrates an example system for managing core network slices based on dynamically determined triggers.

Referring now to FIG. 2, there illustrated is an example system 200 for managing core network slices based on dynamically determined triggers, in accordance with an aspect of the subject disclosure. It is noted that the service abstraction component 102, the radio network control component 104, the transport network control component 106, and the core network control component 108 can comprise functionality as more fully described herein, for example, as described above with regard to system 100. Although system 200 has been described with respect to a 5G network, it is noted that the subject disclosure is not limited to 5G networks and can be utilized in most any communication network. Moreover, system 200 can be utilized to provide an intelligent, flexible, and dynamic network architecture that can enable both network operators and service/application providers in delivering a customized service.

According to an embodiment, UEs 1-N ($202_1$-$202_N$; wherein N is most any natural number) can connect to the communication network via one or more radio networks 204. As an example, the UEs 1-N ($202_1$-$202_N$) can comprise, but are not limited to most any industrial automation device and/or consumer electronic device, for example, a tablet computer, a digital media player, a wearable device, a digital camera, a media player, a cellular phone, a personal computer, a personal digital assistant (PDA), a smart phone, a laptop, a gaming system, set top boxes, home security systems, an Internet of things (IoT) device, a connected vehicle, at least partially automated vehicle (e.g., drones), etc. In one aspect, the radio networks 204 can comprise most any access network such as, but not limited to, 3G, 4G, 5G, WiFi, low power wide area, and/or other non 3GPP networks. In one aspect, RAN data store 206 can store information related to the radio networks 204, such as but not limited to, spectrum data, access point information, cell site information, geographical location data, load, cell identifier, type of access point (e.g., macro, femto, pico, etc.), the access network service chains, functional blocks and/or mode of operations of the access network service chains, etc. As an example, when an access point of radio networks 204 is installed and/or activated, the access point can provide its information to the RAN data store 206 (and/or can update the information periodically and/or in response to an event). In an aspect, the service abstraction component 102 can utilize the information stored within the RAN data store 206 to facilitate selection, reconfiguration, and/or instantiation of a customized core network slice for a service.

According to an embodiment, UEs 1-N ($202_1$-$202_N$) can transmit a request for a service (e.g., streaming video, navigation service, content delivery service, emergency service, etc.) via an access point of the radio networks 204. On receiving the request, the radio network control component 104 can provide a trigger to the service abstraction component 102, which can then determine a type of the service, the quality of experience (QoE) expected for the service, information related to the access network (e.g., from RAN data store 206), information related to the transport routers 208 (e.g., from the transport network control component 106), etc., to provide a trigger (e.g., with information regarding service requirements/attributes for a particular class of devices, latency, network conditions, location of access point, etc.) to the core network control component 108. Based on the trigger, the core network control component 108 can determine whether to utilize a pre-dedicated core network slice, update the pre-dedicated core network slice, or instantiate a new core network slice of the core network slices 1-M ($210_1$-$210_M$; wherein M is most any natural number) to handle the requested service. For example, the core network control component 108 can allocate a pre-dedicated (e.g., already instantiated) core network slice that comprises a defined set of functions that satisfy the service request or can instantiate on-demand and allocate, a new core network slice that is an optimal slice comprising only the essential functions required to handle the service request. In one aspect, for a more delay tolerant service, the core network control component 108 can instantiate the pre-dedicated core network slice, while for less delay tolerant service, the core network control component 108 can create a new logic service function chain in the pre-dedicated core network slice (e.g., reconfigure the pre-dedicated core network slice) or spin the new core network slice that comprises devices that located geographically closer to (e.g., within a defined distance from) the RAN to which the UE has connected. As an example, the core network slices $210_1$-$210_M$ can communicate, via an IP network 212, with one or more application servers (AS) 1-K ($214_1$-$214_K$; wherein K is most any natural number) associated with the service.

In an aspect, the service function chain in a network slice can comprise a group of functional blocks and/or components that are "chained together" (e.g., coupled together) to fulfill attributes, such as but not limited to, service requirements and/or an expected QoE of a requested service in the respective network type (e.g., RAN, wireless core network, WiFi access network, etc.). Each functional block and/or component can be instantiated in a full-support mode, a semi-transparent mode, or a full-transparent mode for different service data flows utilizing the same network slice. This particular concept of service function and/or service component configuration/reconfiguration in a network slice provides even more flexibility and efficiency in the network slicing architecture.

According to an embodiment, subsequent to the core network slice allocation, the service abstraction component 102 can facilitate synchronization of the radio network control component 104 and core network control component 108 to exchange network address data that provides the access point serving the UE with the network address of the core network element (e.g., MME), to which traffic for the service is for be steered. It is noted that the RAN data store 206 can include volatile memory(s) or nonvolatile memory(s), or can include both volatile and nonvolatile memory(s). Examples of suitable types of volatile and non-volatile memory are described below with reference to FIG. 9. The memory (e.g., data stores, databases) of the subject systems and methods is intended to include, without being limited to, these and any other suitable types of memory.

Figure 3:
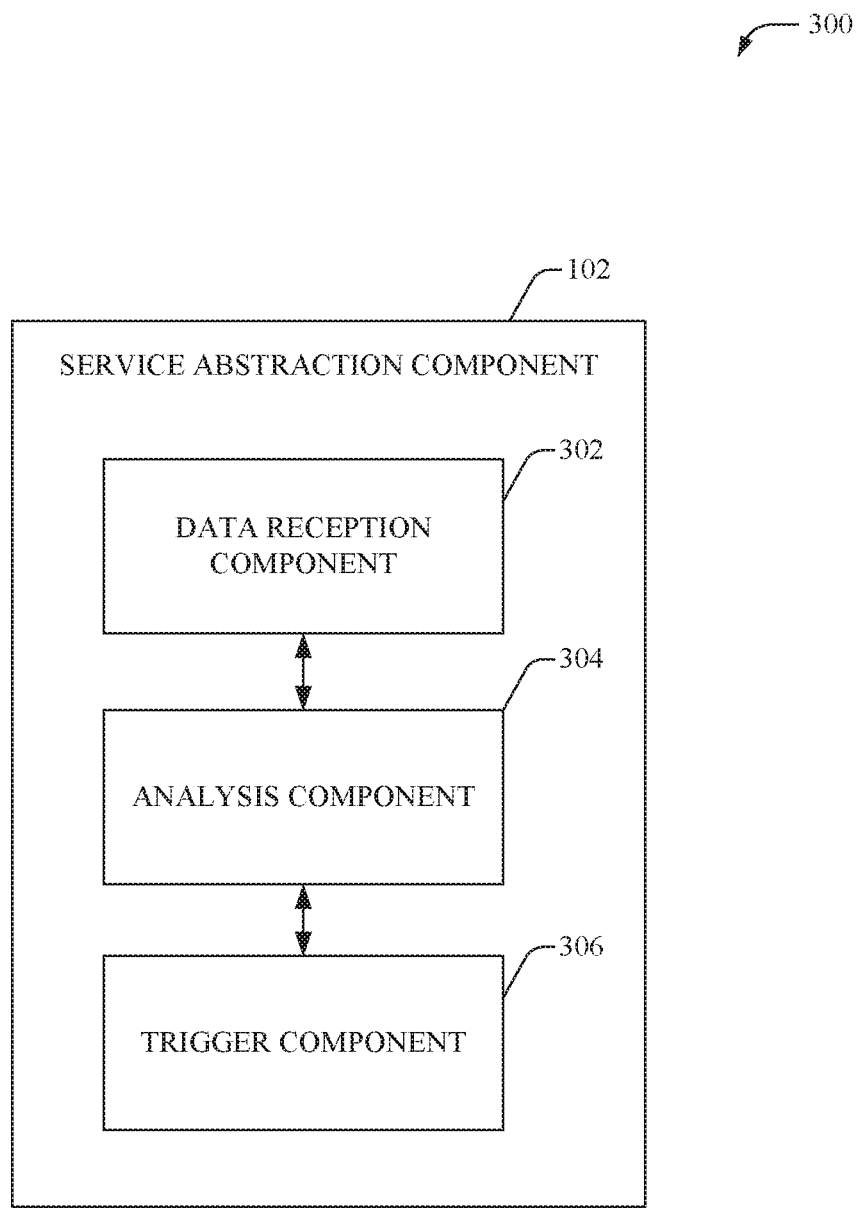
FIG. 3 illustrates an example system that determines triggers to facilitate optimal core network slice selection.

Referring now to FIG. 3, there illustrated is an example system 300 that determines one or more triggers to facilitate optimal core network slice selection, in accordance with an aspect of the subject disclosure. It is noted that the service abstraction component 102 can comprise functionality as more fully described herein, for example, as described above with regard to systems 100 and 200. In one example, the service abstraction component 102 can comprise a data reception component 302 that can receive request-related information from various network devices. In one aspect, the data reception component 302 can receive a trigger from the radio network control component 104 when a service request is received from a UE by an access point coupled to the radio network control component 104. The data reception component 302 can then determine information related to the access point (e.g., from the RAN data store), information related to the UE (e.g., device characteristics, subscriber profile data, etc.), and/or information related to the service (e.g., type of service, latency requirements, quality of service, etc.). Further, the data reception component 302 can collect status information (e.g., load, performance, etc.) related to the transport layer from the transport network control component 106. Additionally or optionally, the data reception component 302 can collect data from one or more network and/or third party servers, for example, but not limited to event data (e.g., time/location details regarding an event), weather data, traffic data, etc.

According to an aspect, an analysis component 304 can evaluate the information collected by the data reception component 302 to determine one or more triggers that are provided to the core network control component 108. For example, the triggers can include, but are not limited to, information indicative of a radio access type supported by the UE, whether the UE has attached to the network using a preferred radio access technology, a change in a location of the UE due to mobility events, speed of the UE, other services requested by the UE, home network re-classification for the UE, network initiated home network resources dynamic modification and/or re-allocation for performance optimization, and/or network initiated UE rehoming (e.g., due to service priority and/or performance needs), etc.

Figure 4:
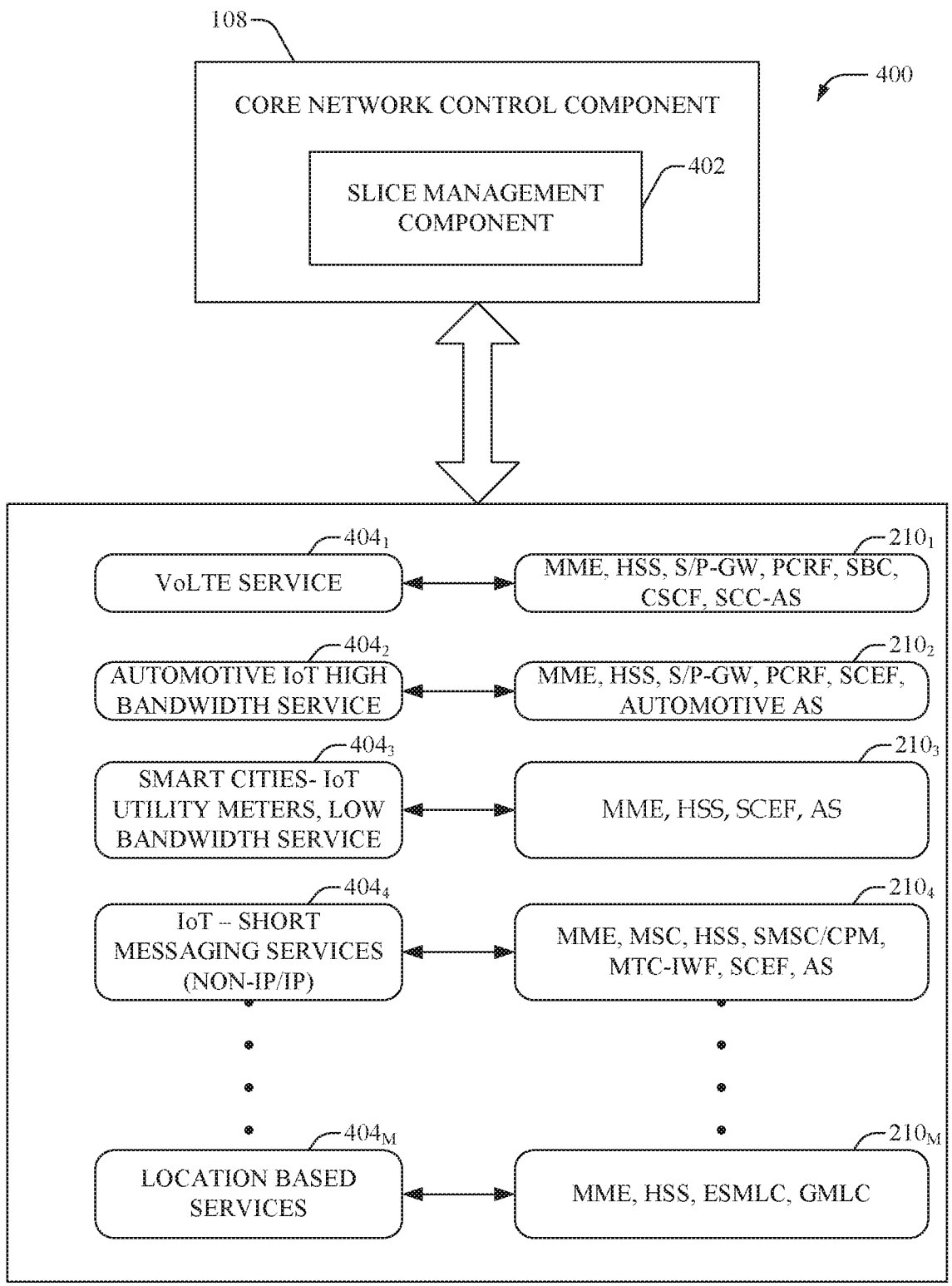
FIG. 4 illustrates an example system that provides dynamic core network slice allocation.

Referring now to FIG. 4, there illustrated is an example system 400 that provides dynamic core network slice allocation, according to an aspect of the subject disclosure. It is noted that the core network control component 108 can comprise functionality as more fully described herein, for example, as described above with regard to systems 100-200. Although system 400 has been described with respect to a 5G network, it is noted that the subject disclosure is not limited to 5G networks and can be utilized in most any communication network.

According to an aspect, a slice management component 402 can be utilized to allocate service requests to different core network slices. In one aspect, the slice management component 402 can determine whether a pre-dedicated core network slice (e.g., that has already been instantiated) is to be allocated for a particular service request or whether a new core network slice is to instantiated to handle the particular service request. In one aspect, the determination can be based on triggers received from the service abstraction component 102, historical data, slice loads and/or performance, service function chain re-configurability in a pre-dedicated core network slice, operator and/or service provider defined policies/preferences, etc. As an example, the slice management component 402 can select an optimal core network slice (existing or new) that is customized for a service requested by a UE based on information (e.g., received from the service abstraction component 102 and/or radio network control component 104), such as, but not limited to, a UE profile (e.g., comprising UE type data (e.g., IoT, smartphone, tablet, etc.) UE category (CAT-0, CAT-1, CAT-3/4, CAT-M, and the like), usage types, access priority, communication and mobility characteristics, access technology supported by the UE, billing characteristics, etc.), UE location (e.g., geographical location, home or roaming/visiting, etc.), service(s) requested (e.g., type of service), UE and/or network/business based policies, local and/or global network load and/or performance conditions (e.g., real-time and/or current network load and/or performance), etc.

In one aspect, the slice management component 402 can exchange access type data with the radio network control component 104 prior to core network resource slice allocation. Moreover, the slice management component 402 can handle (e.g., allocate resources for) service requests from UEs across different access technologies and facilitate service delivery via an optimal transport routing path. In one example, the slice management component 402 can allocate control plane and/or user plane supporting functions within a core network slice based on the type of service requested by the UE and/or the device class/category of the UE. Further, the slice management component 402 can dynamically reroute traffic in-service associated with a given UE and/or service based on its priority. As an example, the slice management component 402 can maintain UE context synchronization with the radio network control component 104 for the service duration.

The services requested by the UE can be associated with a wide range of applications that can be performed by utilizing different network functions. Based on an analysis of information, such as but not limited to, service requirements/attributes for a particular class of devices, latency, network conditions, etc., the slice management component 402 can allocate resources for a particular service. In one example, the slice management component 402 can instantiate a pre-dedicated (e.g., already instantiated) core network slice comprising a defined set of functions that satisfy the service request or can instantiate, on-demand, a new core network slice customized for the service request (e.g., that comprises only the essential functions required to handle the service request).

As an example, core network slice $210_1$ (e.g., comprising MME, HSS, serving/PDN gateway (S/P-GW), policy and charging rules function (PCRF), session border controller (SBC), call session control function (CSCF), and service centralization and continuity application server (SCC-AS) functions) can be allocated for traffic associated with a voice over LTE (VoLTE) service $404_1$; core network slice $210_2$ (e.g., comprising MME, HSS, S/P-GW, policy and charging rules function (PCRF), service capability or network exposure function (SCEF/NEF), automotive application server (AS) functions) can be allocated for traffic associated with automotive Internet of things (IoT) services that utilize high network bandwidth $404d2$; core network slice $210_3$ (e.g., comprising MME, HSS, SCEF/NEF, AS functions) can be allocated for traffic associated with smart city UEs $404_3$ (e.g., IoT utility meters that utilize low network bandwidth); core network slice $210_4$ (e.g., comprising MME, mobile switching center (MSC), HSS, short message service center (SMSC)/converged IP messaging (CPM), machine type communication interworking function (MTC-IWF), SCEF/NEF, AS functions) can be allocated for traffic associated with short messaging services $404_4$ for IoT devices; core network slice $210_M$ (e.g., comprising MME, HSS, evolved serving mobile location center (ESMLC), gateway mobile location center (GMLC) functions) can be allocated for traffic associated with location based services $404_M$, and the like.

As another example, core network slices $210_2$, $210_3$, and/or $210_4$ can be a single network slice dedicated for IoT Services. Depending on service requirements, a logic service function chain can be created for the service data flow. Certain functional blocks and/or components are fully functional in the chain while others may operator in the transparent mode, e.g., in slice $210_3$, the S/PGW and the PCRF can be in the transparent mode.

As noted above, the slice management component 402 can determine whether a pre-existing core network slice is to be utilized for a service request or a new (customized and/or localized) core network slice is to be instantiated and utilized for the service request. For example, if determined that the service satisfies a defined latency criteria (e.g., is delay tolerant) and/or does not have (or has minimal) functional blocks reconfigurations, the pre-existing core network slice can be utilized, whereas if determined that the service fails to satisfy the defined latency criteria (e.g., is not delay tolerant) and/or potential reconfiguration of the functional blocks is too costly for the requested new data service flow, the new core network slice can be instantiated and utilized for the new data service flow. In one aspect, the new core network slice can be geographically closer to the RAN (serving the UE that requested the service). As an example, during an event, such as a concert, game, rally, parade, etc., the service abstraction component 102 can determine an increase in UE density in a given area (e.g., based on UE density information stored within the RAN data store 206 and/or event data received from one or more servers) and provide an appropriate trigger to the core network control component 108, which can then (e.g., via the slice management component 402), spin an instance of a core network slice that is geographically closer to the event location (e.g., as compared to the existing core network slices) to efficiently and quickly address the spike in traffic demand and/or guarantee improved service performance. Once the event is over (e.g., as determined by the service abstraction component 102), the slice management component 402 can deinstantiate the resources and use the predefined slices to handle subsequent traffic having lower/normal demand (e.g., more delay tolerant traffic) from UEs within the event location.

In another example, for requests received from a particular type of UE (e.g., CAT-1, CAT-M, etc.) within a specified location, the service abstraction component 102 can send, to the core network control component 108, a trigger that indicates a group type event. In response to receiving this trigger, the slice management component 402 can create a new localized slice that is close to (e.g., within a defined distance from and/or closer than the other core network sliced to) the specified location to handle traffic from UE's that belong to the particular type and that are located within the specified location. Additionally or alternatively, the slice management component 402 can determine whether a new localized slice is to be created based on loading statistics of the existing core network slices. For example, if the load associated with the existing core network slice $201_1$ is greater than a defined threshold and/or the temporary traffic peak is localized, the slice management component 402 can instantiate a new localized slice to handle a subsequent VoLTE service request for the location. Further, in another example, the slice management component 402 can determine whether a new localized slice is to be created based on determining that a customized set of functions (and/or location of the functions) can provide a superior performance than the performance that would be provided by existing core network slices. For example, on receiving a request for a IoT SMS service that utilizes a direct interface (e.g., SGd interface) between the MME and the SMSC, the slice management component 402 can determine that utilizing a new (and optionally localized) core network slice comprising customized functions (e.g., MME, HSS, SMSC/CPM, MTC-IWF, SCEF/NEF, and AS) can provide a better performance than core network slice $210_4$, and accordingly, instantiate the new core network slice to handle traffic associated with the IoT SMS service request. Furthermore, in yet another example, the slice management component 402 can determine whether a new localized slice is to be created based on revenue generation and/or priority policies. For example, for high priority services (e.g., emergency services) and/or services that are associated with high (e.g., greater than a defined threshold) revenue generation, the slice management component 402 can instantiate a new customized and/or localized core network slice.

It is noted that the slice management component 402 is not limited to vertical network slicing (e.g., one RAN slice, one wireless core slice and one service core slice for an end-to-end network slice), but can also facilitate horizontal slice management for the end-to-end network architecture. In one aspect, one core network slice can support multiple RAN slices with a single core network slice with different service function chains in order to achieving efficiency and reduce the network management overhead. Moreover, a network slice is not monolithic and comprises a set of network functions/components that can form a service function chain in multiple ways, wherein each function/component can be operated in multiple modes. For a example, the mobility management function in the 3GPP network can support both mobile broadband network (MBN) and fixed wireless broadband (FWB) network services. Thus, these services can be operated in one core network slice e.g., the MBN slice, but using two different service function chains. A first service function chain can enable the full capability of the MMF due to the mobility. A second service function chain can also include the MMF but in a transparent mode. In other words, FWB is a special case of the MBB where the vehicular speed is zero. Accordingly, the slice management component 402 can determine whether an existing network slice should be reused and whether a new service function chain (e.g., with the proper operational modes of each functional block) should be created within the existing slice. Further, in one aspect, the slice management component 402 can also determine associations with other network slices (e.g., RAN slices, survivable ad hoc network (SAN) slices and/or subscriber policy domains, etc.). These associations can be one-to-one, one-to-many, many-to-one and/or many-to-many.

Figure 5:
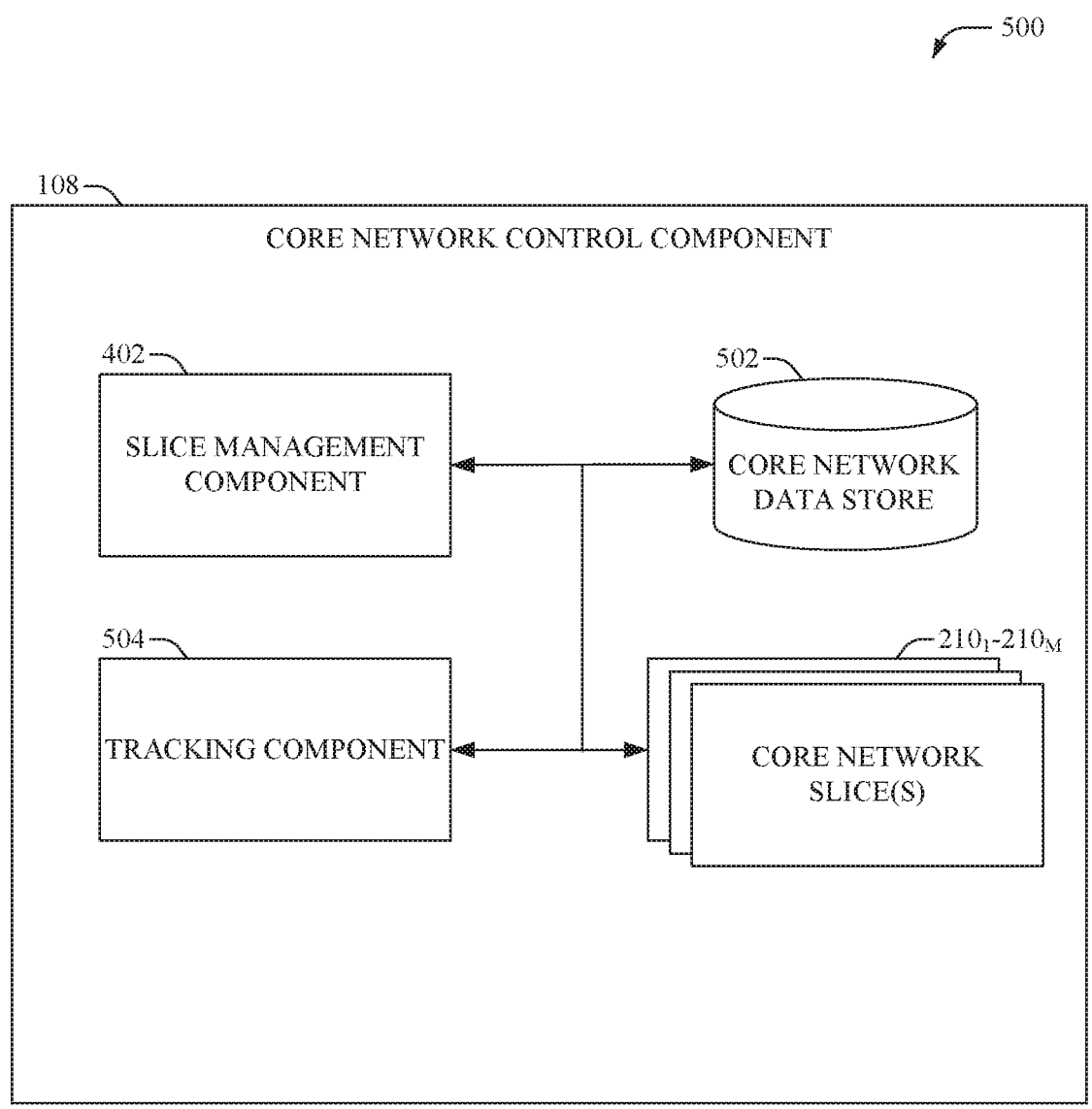
FIG. 5 illustrates an example system that facilitates monitoring of core network slices.

FIG. 5 illustrated an example system 500 that facilitates monitoring of core network slices, according to an aspect of the subject disclosure. It is noted that the core network control component 108, the core network slices $210_1$-$210_M$, and the slice management component 402, can comprise functionality as more fully described herein, for example, as described above with regard to systems 100-200 and 400.

According to an embodiment, when an instance of a core network slice (e.g., core network slices $210_1$-$210_M$) is created, a core network data store 502 is populated with information associated with the core network slice. For example, the information can comprise, but is not limited to, a service type associated with the core network slice, network functions provided by the core network slice, logic service function chains provided by the core network slice, etc. In one aspect, the slice management component 402 can utilize this information to allocate service requests to an appropriate core network slice (and/or to determine that a new core network slice is to be instantiated to handle a service request).

Further, once instantiated, a tracking component 504 can monitor feedback metrics (e.g., throughput, latency, capacity utilization, etc.) associated with performance of a logic service function chain in the core network slices $210_1$-$210_M$ and/or with overall performance of the core network slices. In one aspect, the tracking component 504 can analyze the feedback metrics to verify that service demands and/or expected QoE are being met in real time. As an example, the feedback metrics can also be stored within the core network data store 502. In one aspect, the slice management component 402 can utilize the feedback metrics to determine and/or learn performance patterns associated with the core network slices $210_1$-$210_M$ and their respective service function chains (e.g., determine that a core network slice(s) that performs better with a first type of service than a second type of service). Moreover, the performance patterns can be utilized to allocate subsequent service requests to an optimal core network slice (e.g., determined to have a high performance for the particular service type).

Figure 6A:
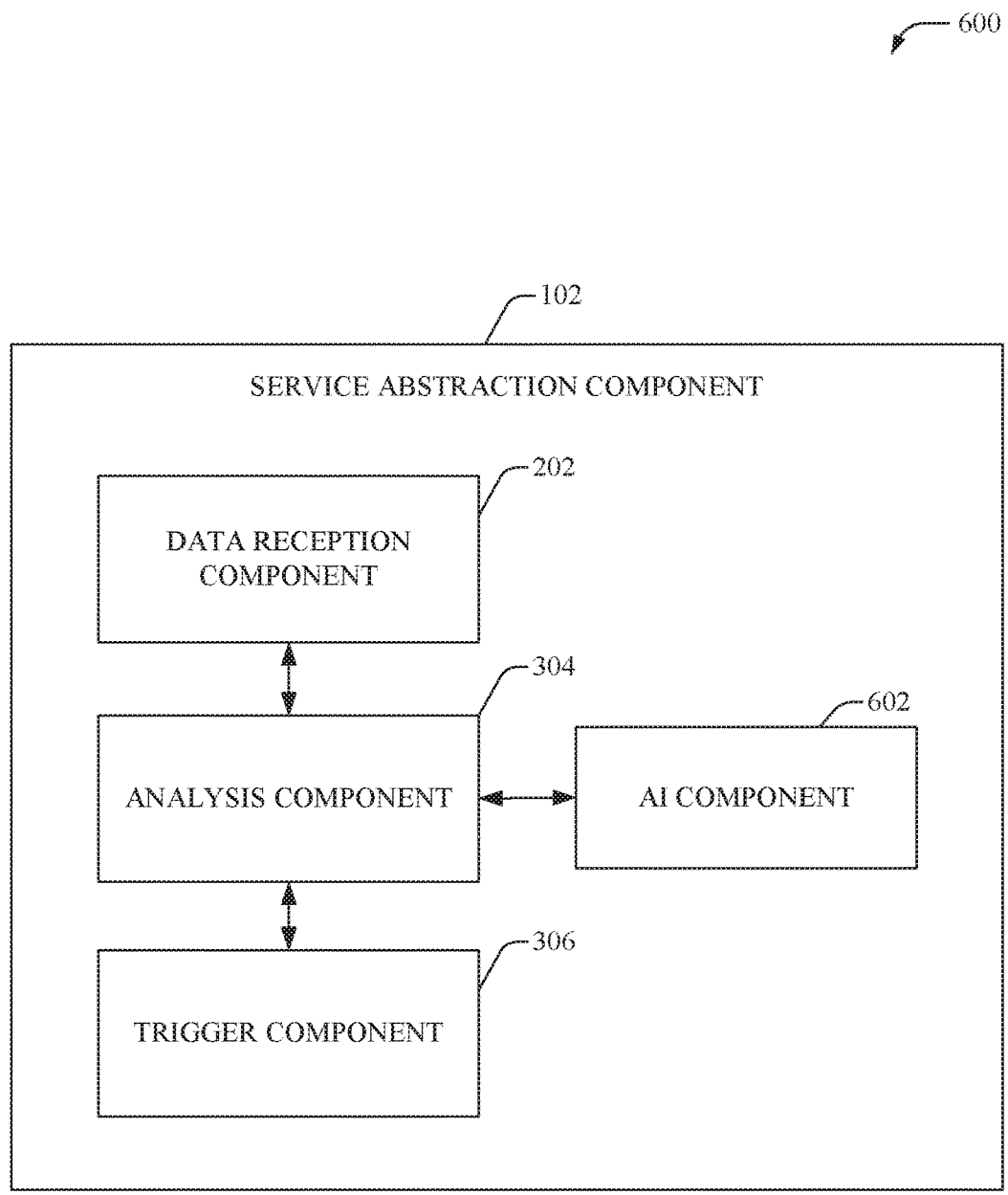
FIGS. 6A-6B illustrates example systems that facilitate automating one or more features in accordance with the subject embodiments.
Figure 6B:
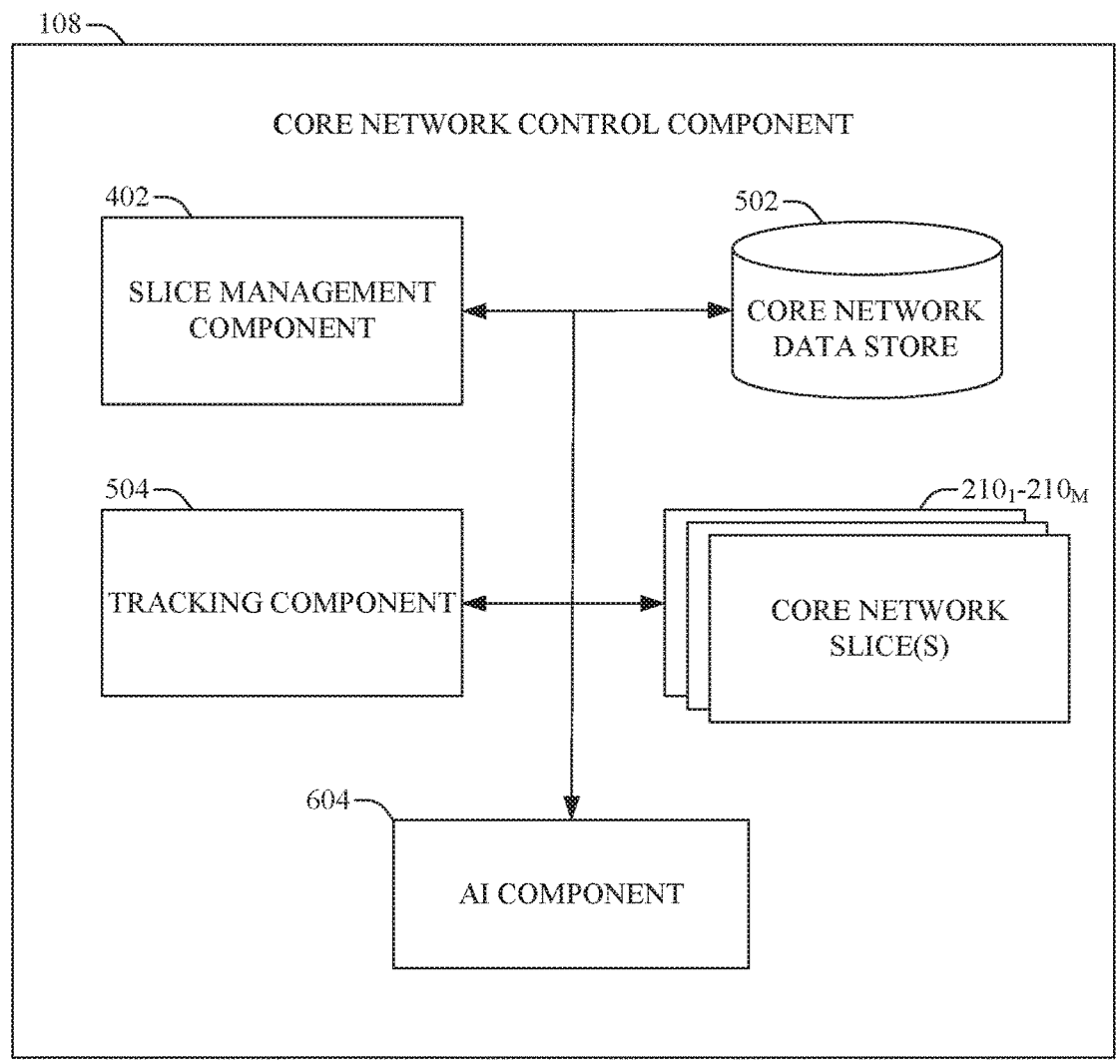

Referring now to FIGS. 6A-6B, there illustrated are example systems 600-650 that employ artificial intelligence (AI) components (602, 604) to facilitate automating one or more features in accordance with the subject embodiments. It can be noted that the service abstraction component 102, core network control component 108, data reception component 202, analysis component 304, trigger component 306, core network slices $210_1$-$210_M$, slice management component 402, core network data store 502, and tracking component 504 can comprise functionality as more fully described herein, for example, as described above with regard to systems 100-500.

In an example embodiment, systems 600 and 650 (e.g., in connection with allocating and/or de-allocating resources for service requests) can employ various AI-based schemes (e.g., intelligent processing/analysis, machine learning, etc.) for carrying out various aspects thereof. For example, a process for determining service attributes, UE preferences, which core network slices to select, instantiate, and/or update, determining user expectation and/or satisfaction, performance of the different core network slices, etc. can be facilitated via an automatic classifier system implemented by AI components 602 and/or 604. Moreover, the AI components 602 and/or 604 can various exploit artificial intelligence (AI) methods or machine learning methods. Artificial intelligence techniques can typically apply advanced mechanisms—e.g., decision trees, neural networks, regression analysis, principal component analysis (PCA) for feature and pattern extraction, cluster analysis, genetic algorithm, or reinforced learning—to a data set. In particular, AI components 602 and/or 604 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 602 can be used to automatically learn and perform a number of functions, comprising but not limited to determining according to a predetermined criteria, service type and attributes, event data, location related data, latency requirements of the service, etc. Further, classifier(s) of AI component 604 can be used to automatically learn and perform a number of functions, comprising but not limited to determining according to a predetermined criteria, an optimal core network slice and/or the most efficient service function chain that are suited handle traffic associated with a specific service data flow, whether an existing core network slice or any service function chain in the core network slice is to be allocated to a service request or a new core network slice with service function chains is to instantiated, etc. The criteria can comprise, but is not limited to, historical patterns and/or trends, user and/or network operator preferences and/or policies, application/service provider preferences, predicted traffic flows, event data, latency data, reliability/availability data, current time/date, location data, performance and/or load data, function/component operational mode flexibility in a service function chain, and the like.

Figure 7:
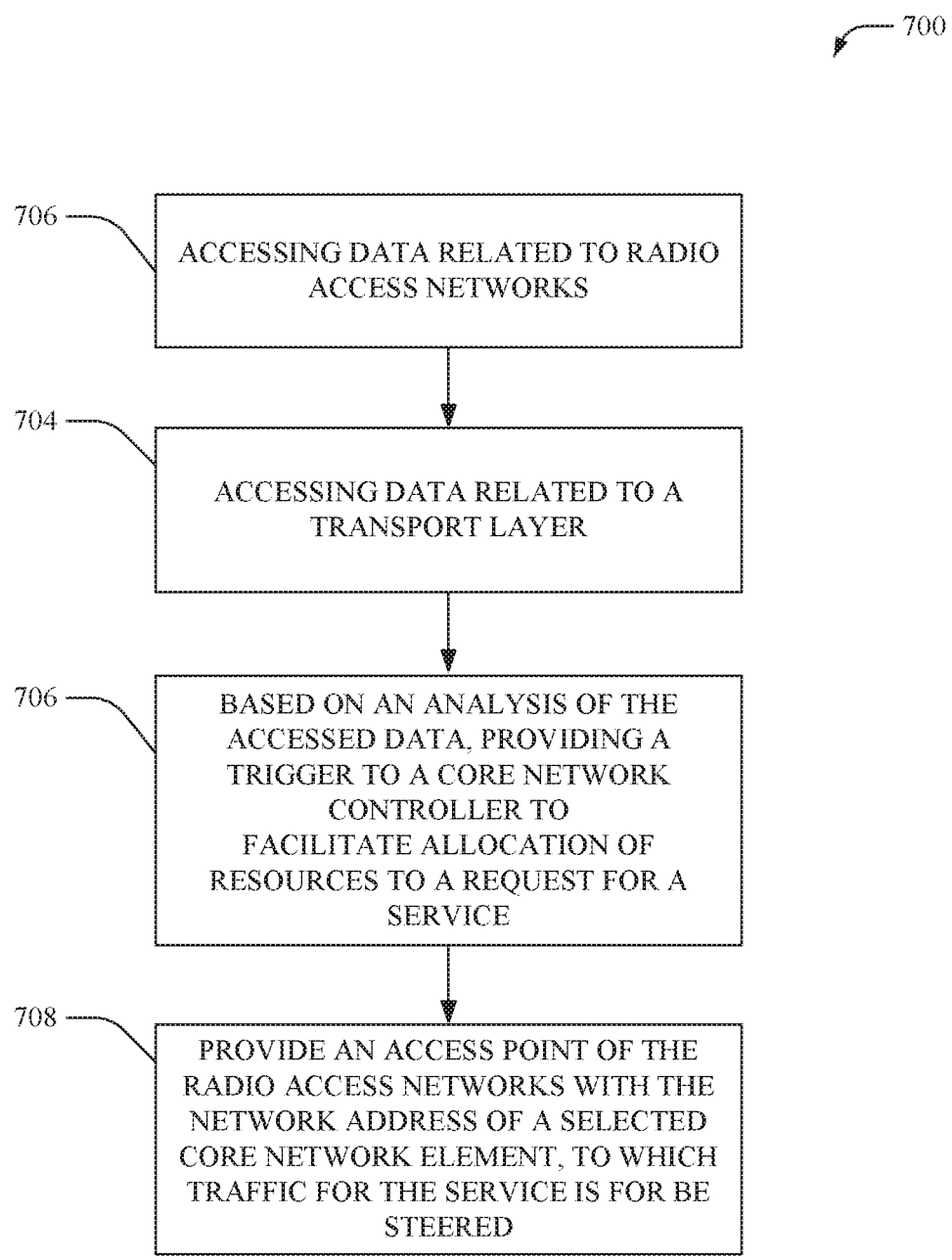
FIG. 7 illustrates an example method that facilitates allocation of core network resources.
Figure 8:
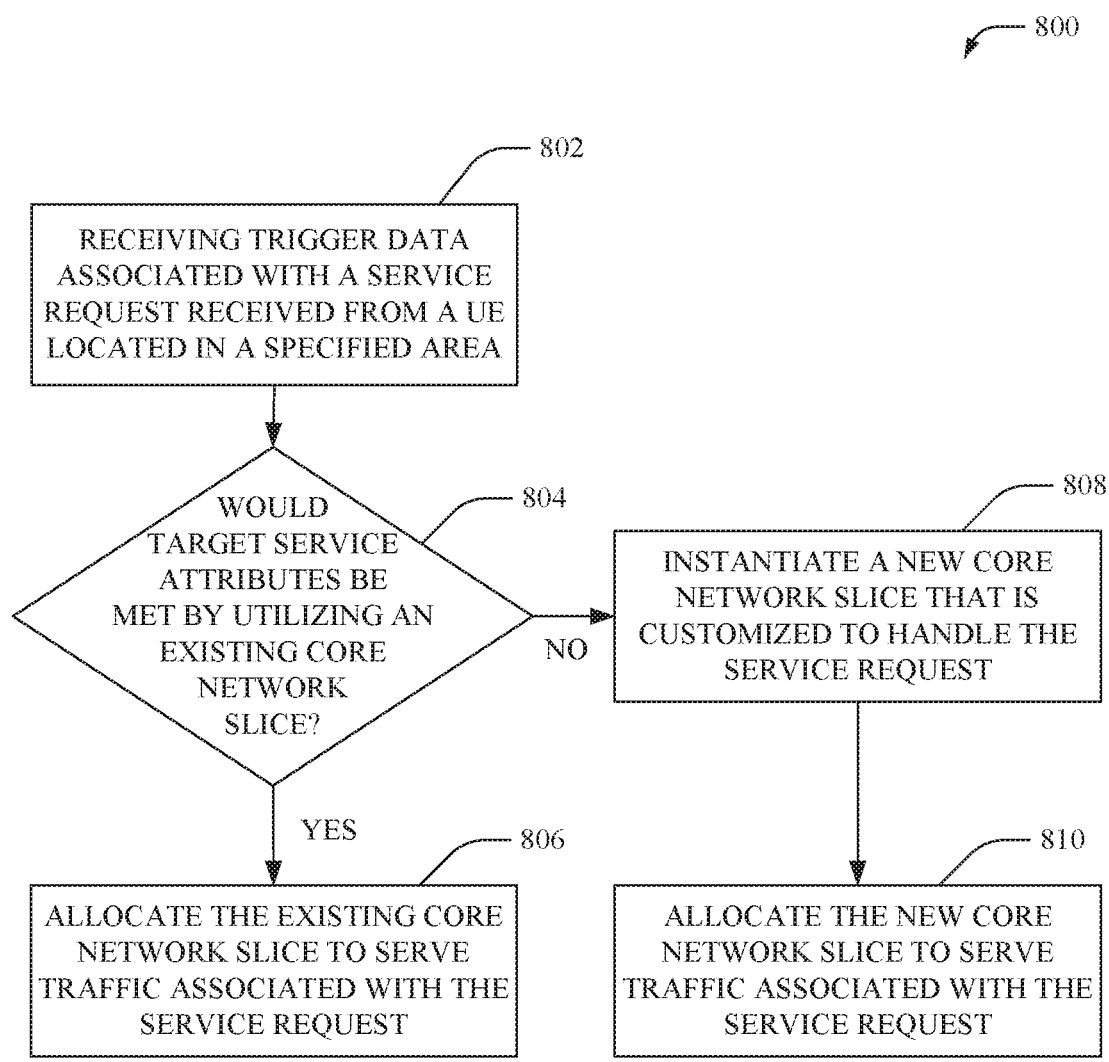
FIG. 8 illustrates an example method that facilitated selection of an optimal core network slice for handling a service request.

FIGS. 7-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that facilitates allocation of core network resources, according to an aspect of the subject disclosure. As an example, method 700 can be implemented by one or more network devices (e.g., service abstraction component 102) of a communication network (e.g., cellular network). At 702, data related to one or more radio access networks can be accessed. In one aspect, the radio access networks can utilize different radio access technologies, such as, but not limited to, 4G, 5G, 3G, WiFi, low power wide area networks, and/or other non-3GPP technologies. Further, the data can comprise but is not limited to, spectrum data across licensed and unlicensed bands, access point information, cell site information, geographical location data, real-time load, cell identifier, type of access point (e.g., macro, femto, pico, etc.), etc.

At 704, data related to one or more transport layers can be accessed. For example, the data can be associated with different devices (e.g., routers and/or switches hosted on central office and/or switching office environments) of backhaul networks that are on the egress and/or ingress of the infrastructure between the RAN and core network. At 706, based on an analysis of the accessed data, a trigger can be provided to a core network controller to facilitate allocation of resources to a request for a service. As an example, the trigger can provide information related to the type of service, service attributes, class of the requesting device, and/or current network conditions (e.g., load, performance, etc.), location of the access point and/or UE, event data, latency specifications of the service, etc. The core network controller can utilize the trigger to select an optimal core network slice and configure a proper service function chain in the core network slice to handle the service request. Further, at 708, the access point can be provided with network address data of the selected core network entity (e.g., MME of the optimal core network slice), to which traffic for the service is to be steered. As an example, the network address can represent an Internet protocol (IP) address of transmission control protocol (TCP)/IP suite of protocols (e.g., TCP/IP, user datagram protocol (UDP)/IP, stream control transmission protocol (SCTP)/IP, any layer 4 through layer 7 (L4-7)/IP), or an asynchronous transfer mode (ATM) address of an ATM network, or an local area network (LAN) address of LAN suite of protocols (e.g., Ethernet, fiber distributed data interface (FDDI), IEEE 802.3 LANs, etc.), or a network address of the network layer in the open systems interconnection (OSI) protocol stacks, or a multiprotocol label switching (MPLS) label in the MPLS network, etc.

FIG. 8 illustrates an example method 800 that selection of an optimal core network slice for handling a service request, according to an aspect of the subject disclosure. As an example, method 800 can be implemented by one or more network devices (e.g., core network control component 108) of a communication network (e.g., cellular network). At 802, trigger data, associated with a service request received from a UE that is located in a specified area, can be received. As an example, the trigger data can comprise information related to the type of service, service attributes, class of the requesting device, current network conditions (e.g., load, performance, etc.), location of the access point and/or UE, event data, and/or latency specifications of the service, etc. At 804, it can be determined whether target service attributes (e.g., latency, performance, etc.) can be met by utilizing an existing core network slice. As an example, parameters such as, current load, performance data, historical data, location, etc., of the existing core network slices can be evaluated to facilitate the determination. If determined that the target service attributes can be met by utilizing an existing core network slice, then at 806, the existing core network slice can be allocated to serve traffic associated with the service. As an example, addressing information associated with an entity of the existing core network slice can be provided to an access point serving the UE so that the access point can direct traffic related to the service request to the entity.

Alternatively, if determined that the target service attributes cannot be met by utilizing an existing core network slice and its associated functions, then at 808, a new core network slice can be readily instantiated. In an aspect, the new core network slice can be customized to handle the service for the class of the UE and/or can be localized (e.g., located in close proximity to the UE/access point). At 810, the new core network slice can be allocated to serve traffic associated with the service. As an example, addressing information associated with an entity of the new core network slice can be provided to the access point so that the access point can direct traffic related to the service request to the entity.

Advanced core network slicing architecture and design principles disclosed herein lay the foundation for building an intelligent as well as robust next generation mobility network infrastructure that is optimized for end-to-end services delivery. In one aspect, the systems 100-650 and methods 700-800 disclosed herein provide various non-limiting advantages, for example, (i) provide an efficient core network slicing design that is suited for 5G traffic demands and its evolution; (ii) provide support for a variety of use cases, industry verticals, and/or usage driven business models; (iii) enable deployment of multiple instances of logical core networks connected to a single RAN; (iv) enable independent scaling of targeted core network slices, on demand, across a given industry vertical and/or set of verticals within the same serving RAN; (v) provide support for scaling of core network slices across multiple RAN technologies; (vi) facilitate intelligent segregation of traffic types based on demand and/or information centric networking requirements; (vii) minimize disruption of core network resources that are critical to revenue generating services; (viii) avoid customized overlays in the mobility core network; etc.

Figure 9:
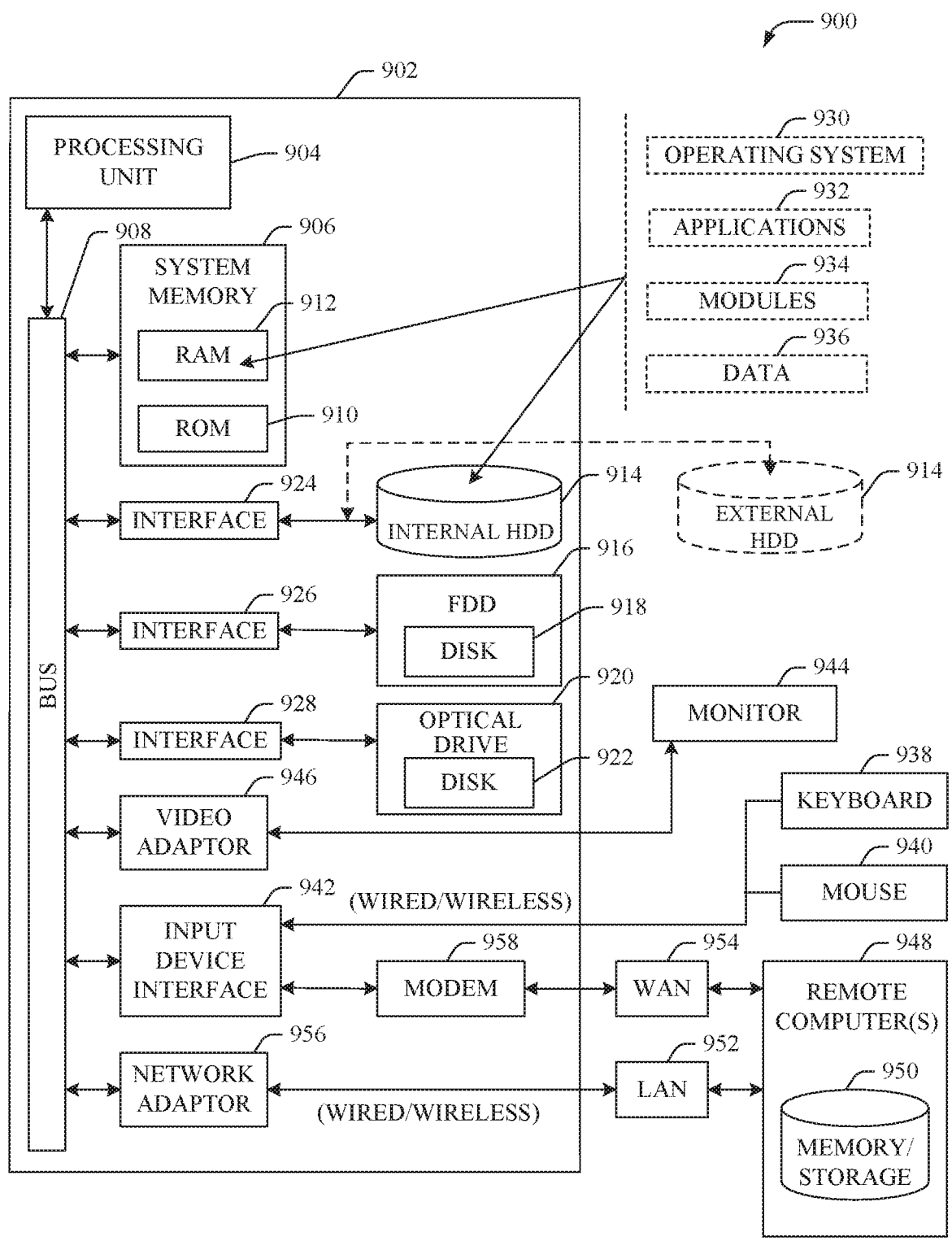
FIG. 9 illustrates a block diagram of a computer operable to execute the disclosed communication architecture.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 9, the example environment 900 for implementing various aspects of the specification comprises a computer 902, the computer 902 comprising a processing unit 904, a system memory 906 and a system bus 908. As an example, the component(s), application(s) server(s), equipment, system(s), interface(s), gateway(s), controller(s), node(s), entity(ies), function(s), cloud(s) and/or device(s) (e.g., service abstraction component 102, radio network control component 104, transport network control component 106, core network control component 108, UEs $202_1$-$202_N$, radio network 204, RAN data store 206, transport router(s) 208, core network slices $210_1$-$210_M$, IP network 212, application servers $214_1$-$214_K$, data reception component 302, analysis component 304, trigger component 306, slice management component 402, core network data store 502, tracking component 504, AI components 602-604, etc.) disclosed herein with respect to systems 100-650 can each comprise at least a portion of the computer 902. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 912, comprising an operating system 930, one or more application programs 932, other program modules 934 and program data 936. All or portions of the operating system, applications, modules, and/or data can also be cached in the RAM 912. It is noted that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated). These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also comprise a wireless access point disposed thereon for communicating with the wireless adapter 956.

When used in a WAN networking environment, the computer 902 can comprise a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be noted that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
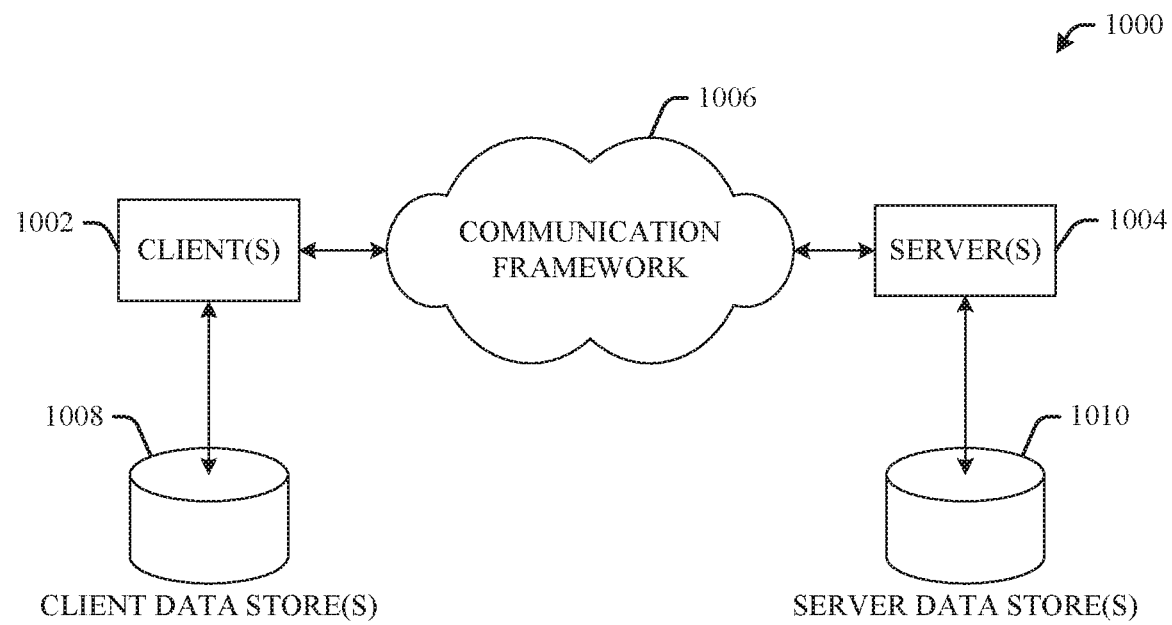
FIG. 10 illustrates a schematic block diagram of a computing environment in accordance with the subject specification

Referring now to FIG. 10, there is illustrated a schematic block diagram of a computing environment 1000 in accordance with the subject specification. The system 1000 comprises one or more client(s) 1002. The client(s) 1002 can be hardware and/or software (e.g., threads, processes, computing devices).

The system 1000 also comprises one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may comprise a cookie and/or associated contextual information, for example. The system 1000 comprises a communication framework 1006 (e.g., a global communication network such as the Internet, cellular network, etc.) that can be employed to facilitate communications between the client(s) 1002 and the server(s) 1004.

Communications can be facilitated via a wired (comprising optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving a request for a service associated with a user equipment that is served by an access network device; and
instantiating a localized network slice of network resources that is employable to deliver the service, wherein the instantiating the localized network slice comprises:
in response to determining that the service generates a revenue that satisfies a revenue generation threshold, instantiating a new localized network slice as the localized network slice, and
in response to determining that the service does not generate the revenue that satisfies the revenue generation threshold, instantiating a pre-existing localized network slice as the localized network slice.

2. The system of claim 1, wherein network functions within the localized network slice are customized based on an attribute of the service.

3. The system of claim 1, wherein instantiating the localized network slice further comprises:
in response to determining that the service is not classified as a delay tolerant service, instantiating the new localized network slice as the localized network slice.

4. The system of claim 1, wherein instantiating the localized network slice further comprises:
in response to determining that the service is classified as a delay tolerant service, instantiating the pre-existing network slice as the localized network slice.

5. The system of claim 1, wherein instantiating the localized network slice further comprises:
in response to determining that the service has been assigned a priority that is determined to satisfy a high priority criterion, instantiating the new localized network slice as the localized network slice.

6. The system of claim 1, wherein instantiating the localized network slice further comprises:
in response to determining that the new localized network slice is to provide superior performance to the pre-existing network slice, instantiating the new localized network slice as the localized network slice.

7. The system of claim 1, wherein the operations further comprise:
directing, to the access network device, address data indicative of a control plane device of the localized network slice to facilitate steering of communication data associated with the service between the access network device and the control plane device.

8. A method, comprising:
receiving, by a system comprising a processor, a request for a service associated with a user equipment that is served by an access network device; and
instantiating, by the system, a localized network slice of network resources that is employable to deliver the service, wherein the instantiating the localized network slice comprises:
in response to determining that the service generates a revenue that satisfies a revenue generation threshold, instantiating a new localized network slice as the localized network slice, and
in response to determining that the service does not generate the revenue that satisfies the revenue generation threshold, instantiating a pre-existing localized network slice as the localized network slice.

9. The method of claim 8, wherein network functions within the localized network slice are customized based on an attribute of the service.

10. The method of claim 8, wherein instantiating the localized network slice further comprises:
in response to determining that the service is not classified as a delay tolerant service, instantiating the new localized network slice as the localized network slice.

11. The method of claim 8, wherein instantiating the localized network slice further comprises:
in response to determining that the service is classified as a delay tolerant service, instantiating the pre-existing network slice as the localized network slice.

12. The method of claim 8, wherein instantiating the localized network slice further comprises:
in response to determining that the service has been assigned a priority that is determined to satisfy a high priority criterion, instantiating the new localized network slice as the localized network slice.

13. The method of claim 8, wherein instantiating the localized network slice further comprises:
in response to determining that the new localized network slice is to provide a superior performance to the pre-existing network slice, instantiating the new localized network slice as the localized network slice.

14. The method of claim 8, further comprising:
directing, by the system to the access network device, address data indicative of a control plane device of the localized network slice to facilitate steering of communication data associated with the service between the access network device and the control plane device.

15. A non-transitory machine-readable medium, comprising executable instructions that, when executed by a processor, facilitate performance of operations, comprising:
receiving a request for a service associated with a user equipment that is served by an access network device; and
instantiating a localized network slice of network resources that is employable to deliver the service, wherein the instantiating the localized network slice comprises:
in response to determining that the service generates a revenue that satisfies a revenue generation threshold, instantiating a new localized network slice as the localized network slice, and
in response to determining that the service does not generate the revenue that satisfies the revenue generation threshold, instantiating a pre-existing localized network slice as the localized network slice.

16. The non-transitory machine-readable medium of claim 15, wherein network functions within the localized network slice are customized based on an attribute of the service.

17. The non-transitory machine-readable medium of claim 15, wherein instantiating the localized network slice further comprises:
in response to determining that the service is not classified as a delay tolerant service, instantiating the new localized network slice as the localized network slice.

18. The non-transitory machine-readable medium of claim 15, wherein instantiating the localized network slice further comprises:
in response to determining that the service is classified as a delay tolerant service, instantiating the pre-existing network slice as the localized network slice.

19. The non-transitory machine-readable medium of claim 15, wherein instantiating the localized network slice further comprises:
    in response to determining that the service has been assigned a priority that is determined to satisfy a high priority criterion, instantiating the new localized network slice as the localized network slice.

20. The non-transitory machine-readable medium of claim 15, wherein instantiating the localized network slice further comprises:
    in response to determining that the new localized network slice is threshold likely to provide a superior performance to the pre-existing network slice according to a performance criterion, instantiating the new localized network slice as the localized network slice.

\* \* \* \* \*